Figure 8:
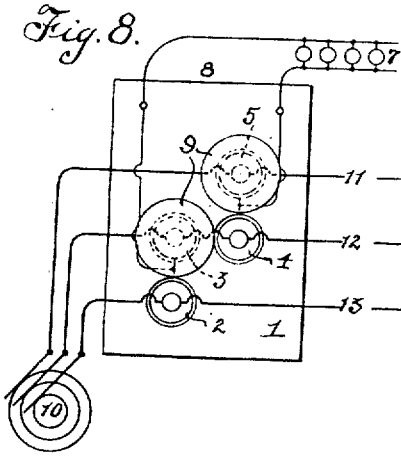

No. 840,216. PATENTED JAN. 1, 1907.
R. HUNDHAUSEN.
SYSTEM OF ELECTRICAL DISTRIBUTION.
APPLICATION FILED FEB. 19, 1900.
2 SHEETS—SHEET 1.
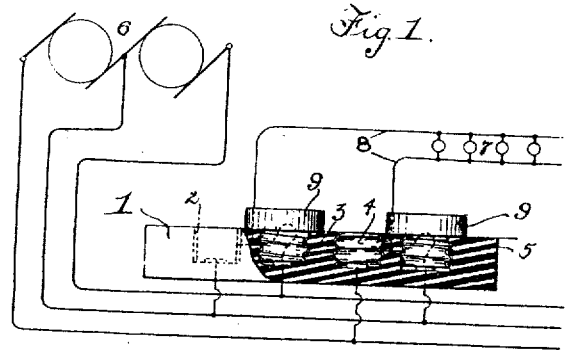
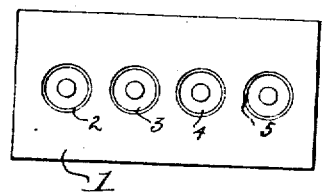
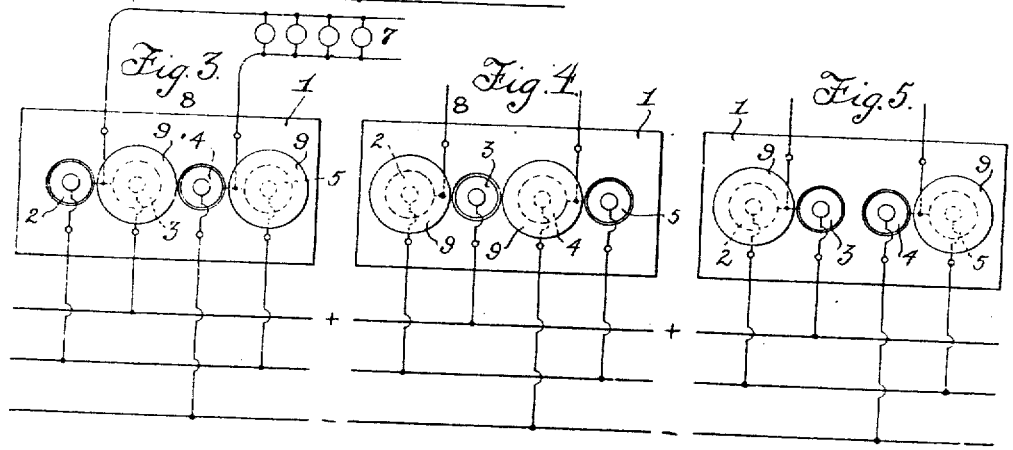
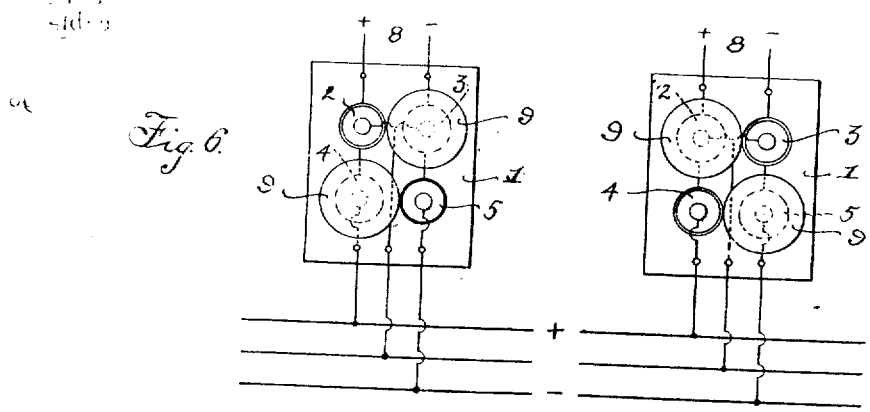
Witnesses:
Inventor.
Rudolf Hundhausen,
By Charles A. Brown & Cragg
Attorneys.

No. 840,216. PATENTED JAN. 1, 1907.
R. HUNDHAUSEN.
SYSTEM OF ELECTRICAL DISTRIBUTION.
APPLICATION FILED FEB. 19, 1900.

2 SHEETS—SHEET 2.

Witnesses:
Max W. Zabel.
Chas. J. Schmidt.

Inventor
Rudolf Hundhausen
By Charles A. Brown & Cragg
Attorneys.

UNITED STATES PATENT OFFICE.

RUDOLF HUNDHAUSEN, OF WILMERSDORF, NEAR BERLIN, GERMANY, ASSIGNOR, BY MESNE ASSIGNMENTS, TO GENERAL ELECTRIC COMPANY, A CORPORATION OF NEW YORK.

SYSTEM OF ELECTRICAL DISTRIBUTION.

No. 840,216.

Specification of Letters Patent.

Patented Jan. 1, 1907.

Application filed February 19, 1900. Serial No. 5,785.

*To all whom it may concern:*

Be it known that I, RUDOLF HUNDHAUSEN, a subject of the Emperor of Germany, residing at Wilmersdorf, near Berlin, Germany, have invented a certain new and useful Improvement in Systems of Electrical Distribution, of which the following is a full, clear, concise, and exact description, reference being had to the accompanying drawings, forming a part of this specification.

My invention relates to electrical systems of distribution, and more particularly to circuits employing three or more transmission-conductors, and has for its object the provision of an improved fuse-base whereby subcircuits may be safely connected between different sides of the system.

In electrical systems of distribution in which three or more wires are used it is frequently necessary that the fuse-base be of such construction that subcircuits, which, as a rule, employ only two wires, may be connected to either one of the circuits of the distribution system. For instance, in a three-wire direct-current system it is desirable so to construct the fuse-bases that a subcircuit may be connected either between the positive and neutral wires or between the negative and neutral wires at the same point. It is also of decided advantage that the fuse-bases be of such form and the arrangement of the fuse-plugs such that this change of connection will not reverse the current through the subcircuit. In three-phase alternating circuits it is likewise of importance that subcircuits may be readily connected between any two of the three main conductors, and my invention provides means whereby this may be satisfactorily and easily accomplished.

In the fuse-bases as formerly constructed means were supplied whereby a subcircuit might be connected across either circuit of a three-wire system, the three conductors of the three-wire system being connected, respectively, to three internal contact-terminals of the fuse-plug receptacles upon the fuse-base, one external contact of a fuse-receptacle or socket being connected directly to one side of the subcircuit, the central contact of this one being connected to the neutral wire of the three-wire system, the other two external contacts of the remaining sockets being connected together and with the remaining side of the subcircuit. A fuse-plug had always to be inserted in that fuse-plug receptacle or socket whose interior contact was connected with the neutral wire, while the polarity of the remaining wire of the subcircuit depended upon which of the other sockets had fuse-plugs inserted therein, the polarity being either positive or negative, depending upon whether the fuse-plug was inserted in the socket whose central contact was connected with the positive wire or in the socket whose central contact was connected with the negative wire. It is obvious that in this construction the direction of the current in the subcircuit depends upon the insertion of the fuse-plug in one or the other of the sockets. Short circuits may also occur in constructions of this kind, inasmuch as the insertion of two fuse-plugs simultaneously into the two sockets whose external contact-terminals are connected together would cause a short circuit between the two external conductors of the three-wire system. Difficulties of like nature were occasioned by the use of similar fuse-bases when used in connection with three-phase systems.

It is the prime object of this invention to provide a fuse-base construction whereby subcircuits may be changed from one side of the transmission system to the other without a reversal of the current therethrough and wherein the improper insertion of fuse-plugs into the sockets causing short circuits is avoided.

In accordance with my invention I so relatively dispose certain fuse-sockets upon the fuse-base that their central displacement— *i. e.*, the distance from center to center thereof—is somewhat less than the external diameter of a fuse-plug. I also preferably provide two fuse-sockets for one of the transmission-conductors, preferably the neutral wire, in a three-wire direct-current system, so that the polarity of the subcircuit remains unchanged.

I will describe my invention more particularly by reference to the accompanying drawings, illustrating diagrammatically the preferred embodiment thereof, in which—

Figure 9:
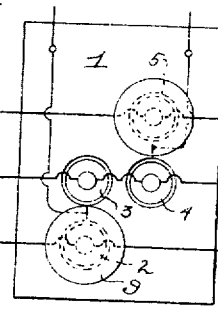
Figure 10:
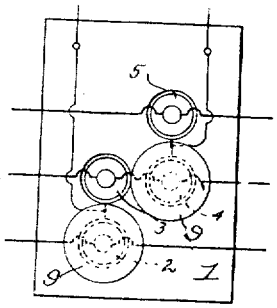
Figure 11:
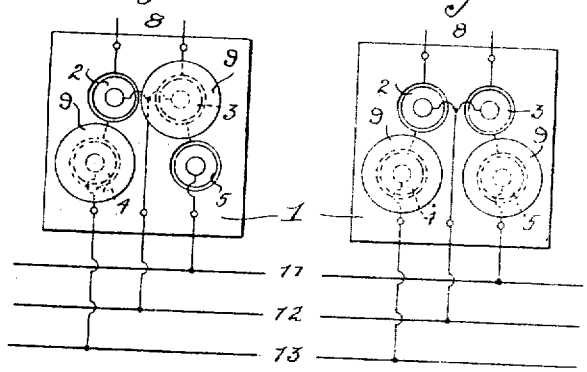
Figure 12:
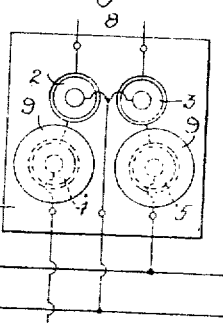
Figure 13:
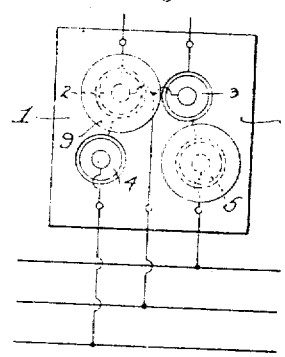
Figure 14:
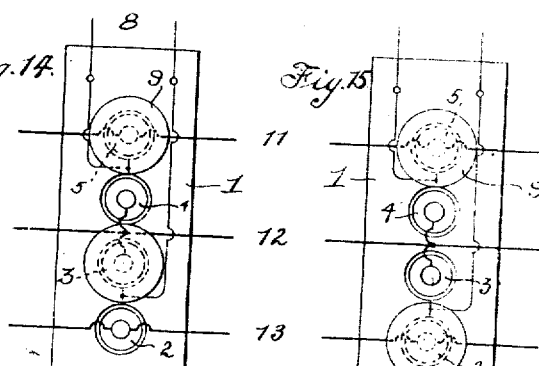
Figure 15:
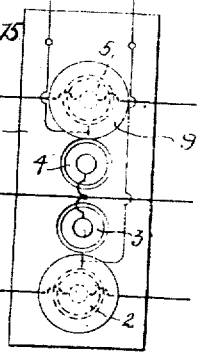
Figure 16:
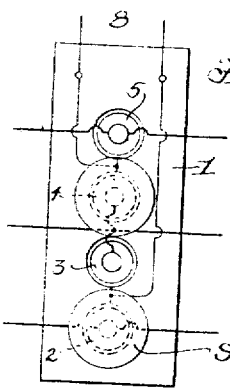

Figure 1 is a side elevation of a fuse-base constructed in accordance with my invention. Fig. 2 is a top view thereof. Figs. 3, 4, and 5 represent diagrammatically an arrangement of fuse-bases in accordance with my invention as applied to three-wire direct-current systems, the three possible conditions of the polarity of the subcircuit as controlled by the various arrangements for fuse-plugs being shown. Figs. 6 and 7 represent diagrammatically the preferred embodiment of my invention as applied to three-wire direct-current systems. Figs. 8, 9, and 10 represent one embodiment of my invention as applied to three-wire three-phase systems. Figs. 11, 12, and 13 represent another embodiment of my invention as applied to similar systems. Figs. 14, 15, and 16 represent the preferred embodiment of my invention as applied to three-phase three-wire systems.

Like figures of reference indicate similar parts throughout the figures.

Referring now to Figs. 1, 2, and 3, a fuse-base 1 is shown as supplied with four fuse-sockets 2 3 4 5, the central contacts of fuse-plugs 2 and 5 being connected to the neutral wire of a three-wire system supplied by the source of current 6 and furnishing current to translating devices 7. The internal contact of fuse-socket 3 is connected to the positive wire in the three-wire system in this instance, while the internal contact of fuse-socket 4 is connected to the negative wire of the same system. The external contact-terminals of fuse-sockets 2 and 3 are electrically connected, as are also the external contact-terminals of the fuse-sockets 4 and 5. One side of the subcircuit 8 is preferably connected to the external contacts 2 and 3, while the remaining side of the subcircuit is preferably connected to the external contact-terminals of the sockets 4 and 5. The fuse-plugs 9 have an external diameter which is larger than the central displacement of two adjacent fuse-sockets, thereby permitting of only three conditions for insertion of fuse-plugs, which are diagrammatically illustrated in Figs. 3, 4, and 5, it being impossible to insert fuse-plugs in two adjacent fuse-sockets, thereby obviating the difficulties of short circuits above referred to.

In Fig. 3 fuse-plugs are shown as inserted in fuse-sockets 3 and 5, whereby the subcircuit is connected between the positive and neutral wires, the left-hand wire of the subcircuit 8 being of higher potential. In Fig. 4 fuse-plugs are shown as inserted in fuse-sockets 2 and 4, whereby the subcircuit is connected between the neutral and negative wires of the three-wire system, the left-hand wire being again of higher potential than the remaining wire. It is obvious from these two figures that by the use of the improved means disclosed in my invention the polarity of the subcircuit 8 remains the same irrespective of its connections between the conductors of the three-wire system.

In Fig. 5 fuse-plugs are shown as inserted in the fuse-sockets 2 and 5, whereby both sides of the subcircuit 8 are connected to the neutral wire of the three-wire system. To obviate this arrangement, I preferably relatively associate the fuse-sockets upon the fuse-base in the manner shown in Figs. 6 and 7, in which the fuse-sockets are shown as arranged at the vertices of a square the length of the sides of the square being somewhat less than the external diameter of the fuse-plug, the diagonal of the square, however, being at least equal to or larger than the said diameter, whereby only two arrangements of fuse-plugs in the fuse-sockets is possible. One arrangement is shown in Fig. 6, and the remaining one in Fig 7. In both of these arrangements the left-hand wire is positive with respect to the right-hand wire, and no reversal of current takes place upon a change of connections from that shown in Fig. 6 to that shown in Fig. 7, while the difficulty of having both sides of the subcircuit connected to the neutral wire is avoided.

In Figs 8, 9, and 10 I have shown diagrammatically the relative dispositions of fuse-sockets upon a fuse-base n accordance with my invention as applied to a three-phase three-wire system consisting of a three-phase generator 10 and the three transmission-conductors 11, 12, and 13, a subcircuit 8 furnishing current to translating devices 7, the three possible arrangements of fuse-plugs being shown therein. The central contact-terminals of two fuse-sockets are connected to one of the wires of the three-wire system—in this instance wire 12—the central contacts of the remaining fuse-sockets being respectively connected to the remaining wires of the three-phase system. The external contact-terminals of sockets 2 and 3 are united electrically and connected to one side of the subcircuit 8, while the external contact-terminals of fuse-sockets 4 and 5 are electrically united and connected to the remaining wire of the said subcircuit. In Fig. 8 the subcircuit 8 is connected across the transmission-conductors 11 and 12, in Fig. 9 across the transmission-conductors 11 and 13, and in Fig. 10 across the transmission-conductors 12 and 13, the central displacement of adjacent fuse-sockets being such that two fuse-plugs may not be inserted therein at the same time and avoiding the difficulty of short circuits, also obviating the difficulty of having the two sides of the subcircuits connected to a single transmission-conductor, which would be the case if fuse-plugs could be simultaneously inserted in the fuse-sockets 3 and 4. It is apparent, therefore, that by the use of my improved means electrical subcircuits may be safely changed from one side of a system to the other without thereby injuring the electrical conditions or in any way causing short circuits.

In Figs. 11, 12, and 13 I have shown another manner of arranging the fuse-sockets, the central displacement of adjacent sockets being again less than the external diameter of the fuse-plugs, while the displacement between fuse-sockets 2 and 5 is equal to or greater than the said diameter, the three possible conditions for insertion of fuse-plugs being diagrammatically indicated in said figures.

Figs. 14, 15, and 16 illustrate diagrammatically another simple arrangement of fuse-sockets, said arrangement being in a straight line and adjacent sockets having a central displacement of less than the diameter of a fuse-plug, the three possible conditions for the insertion of fuse-plugs being diagrammatically indicated in the sa d figures, the relative arrangement of the subcircuits between the three sides of the transmission-conductors being similar to those shown in Figs. 8, 9, and 10.

While I have herein shown and particularly described the preferred embodiment of my invention, I do not wish to be limited to the precise arrangement shown, as modifications may readily be made without departing from the spirit thereof, and I therefore claim as new, and desire to secure by Letters Patent, the following:

1. A device for connecting a single circuit with any one of a plurality of energizing-circuits without reversing the polarity of the conductors of the single circuit, which consists in independent means for connecting the opposite sides of the single circuit with any one of the conductors of the plurality of energizing-circuits, and means for causing all such connections made simultaneously to retain the polarity of the aforesaid conductors constant, substantially as described.

2. A device for connecting a single circuit with any one of a plurality of energizing-circuits, comprising independent means for connecting the opposite sides of said single circuit with any one of the conductors of the plurality of circuits, said means being constructed so as to prevent different simultaneous connections from changing the polarity of conductors of the single circuit, substantially as described.

3. A device for connecting a single circuit with any one of a plurality of circuits, which consists of a base having a plurality of sockets to which the conductors of the single circuit and the plurality of circuits are connected so as to permit the connection of the sides of the single circuit with desired conductors of the plurality of circuits, and plugs adapted to fit in said sockets, said connection to the sockets being made and the plugs being constructed so as to prevent simultaneous connection made by inserting the plugs from changing the relative polarity of the conductors in the single circuit, substantially as described.

4. A device for connecting a single circuit with any one of a plurality of energizing-circuits, which consists of a base having a plurality of sockets to which the conductors of the single circuit and of the plurality of energizing-circuits are connected so as to permit the connection of the opposite sides of the single circuit with any one of the conductors of the plurality of circuits, plugs adapted to fit into said sockets and having their outer ends enlarged, the connections to the sockets being such and the sockets being arranged in such a manner that plugs to connect the single circuit with one of the plurality of circuits to establish different polarities in the single circuit, cannot be simultaneously inserted, substantially as described.

5. A device for connecting a three-wire system with subcircuit, comprising separately-movable means for connecting the conductors of the subcircuits with any one of the conductors of the three-wire system, and means for causing all simultaneous connections to produce in the conductors of the single circuit the same polarity for the currents passing therethrough, substantially as described.

6. A device for connecting three-wire systems with subcircuits, comprising a base having four sockets, two of which are connected with the neutral wire and the other two of which are connected with the positive and negative wires and the plugs having their outer ends made larger than the central displacement of the sockets, whereby the plugs cannot be inserted in adjacent sockets, substantially as described.

7. A device for connecting a three-wire system with subcircuits, consisting of a base having four sockets arranged at substantially equal distances from one another, two of said sockets having their inner contacts connected with the neutral wire of the system, and the other two of said sockets having their inner contacts connected with the positive and negative wires of the system, the outer contacts of one end pair of sockets being adapted for connection with one side of the subcircuit, and the outer contacts of the other end pair of sockets being adapted for connection with the other side of the subcircuit, and plugs adapted to fit into said sockets and having their outer ends made larger than the central displacement of said sockets, whereby the plugs cannot be inserted into the adjacent sockets, substantially as described.

8. A device for connecting a three-wire system with subcircuits, comprising a base having four sockets arranged in quadrilateral form, two of said sockets adjacent to one another having their inner contacts connected with the neutral wire of said system, and the other sockets having their inner contacts connected with the positive and negative wires of said system, the outer contacts of one of the sockets connected with the neutral wire and of the socket connected with the positive wire being adapted for connection with one side of the subcircuit, and the outer contacts of the other socket connected with the neutral wire and of the socket connected with the negative wire being adapted for connection with the other side of the subcircuit, and plugs adapted to fit into said sockets and having their outer ends made larger than the distance between centers of adjacent sockets, substantially as described.

9. A device of the class specified, comprising a base having a plurality of sockets, and a number of plugs adapted to fit into said sockets, said plugs having their outer ends enlarged so as to prevent the simultaneous insertion of plugs into adjacent sockets, substantially as described.

10. A switching device, comprising a base having sockets and plugs adapted to fit into said sockets, having their outer ends enlarged so as to prevent the simultaneous insertion of plugs into adjacent sockets, substantially as described.

11. A device of the class specified, comprising a base having a plurality of sockets arranged in quadrilateral form, and a number of plugs adapted to fit into said sockets, the plugs having their outer ends enlarged so as to prevent plugs being inserted simultaneously into adjacent sockets, substantially as described.

12. A device of the class specified, comprising a base having sockets arranged in the form of a parallelogram and the distance between certain of said sockets shorter than the distance between others of said sockets, and plugs adapted to fit into said sockets, said plugs having their outer ends enlarged so as to prevent the simultaneous insertion of plugs in the sockets separated by the short distances, substantially as described.

13. The combination with a three-wire system and a subcircuit, of means comprising a pair of independent circuit-closing devices for connecting the subcircuit with any desired two of the three wires of the three-wire system, substantially as described.

14. The combination with conductors affording a plurality of circuits and with a single circuit, of means comprising a pair of independent circuit-closing devices for connecting the single circuit with the conductors forming any one of the said circuits, the polarity of the single circuit being the same irrespective of the conductors to which it is connected, substantially as described.

15. A device of the class specified, comprising three or more sockets arranged so that the distance between one of said sockets and another of said sockets is shorter than the distance between said first-mentioned socket and another of said sockets, and plugs adapted to fit into said sockets, said plugs having their outer ends arranged so as to prevent the simultaneous insertion of plugs in the sockets separated by the shorter distance.

16. The combination with a circuit comprising three coöperating conductors and a subcircuit, of means whereby the said subcircuit can be simultaneously connected with two of said three coöperating conductors, said means preventing the simultaneous connection of the said subcircuit-conductors with any but the desired coöperating conductors.

17. A device of the class specified, comprising plugs for connecting any desired conductors or sets of conductors, and means for preventing the improper simultaneous connection of two or more of such conductors or sets of conductors, substantially as described.

18. In a device of the class described, the combination with a supply-circuit having a given number of wires, of a consumption-circuit having a lesser number of conducting-wires, and separately-movable means for selectively connecting conductors of the consumption-circuit with conductors of the supply-circuit, substantially as described.

19. In a device of the class described, the combination with a supply-circuit having a given number of wires, of a consumption-circuit having a lesser number of conducting-wires, independent means for selectively connecting conductors of the consumption-circuit with conductors of the supply-circuit, and means for preventing the simultaneous connection of a conductor of the consumption-circuit with more than one conductor of the supply-circuit, substantially as described.

20. In a system of distribution, the combination with a consumption-circuit, of a supply-circuit having more than two conductors, separately-movable means for connecting said consumption-circuit with either of the supply-circuits, said means preventing the change of polarity of the conductors of said consumption-circuit irrespective of which of the supply-circuits said consumption-circuit is connected with, substantially as described.

In witness whereof I hereunto subscribe my name this 26th day of January, A. D. 1900.

RUDOLF HUNDHAUSEN.

Witnesses:
 HENRY HASPER,
 WOLDEMAR HAUPT.